June 6, 1967  W. J. GREENLEAF  3,323,193

CUTTING TOOL CARTRIDGE INSERT

Filed Dec. 16, 1965

INVENTOR.
Walter J. Greenleaf
BY Ralph Hammar
Attorney 3,323,193
CUTTING TOOL CARTRIDGE INSERT
Walter J. Greenleaf, Meadville, Pa., assignor of one-half to Walter J. Greenleaf, Jr.
Filed Dec. 16, 1965, Ser. No. 514,285
3 Claims. (Cl. 29—96)

This invention is a cartridge insert for mounting cutting bits in boring bars, turning tools, facing tools and the like which has the advantages of easy and accurate adjustment and readily interchangeable tools.

Figure 1:
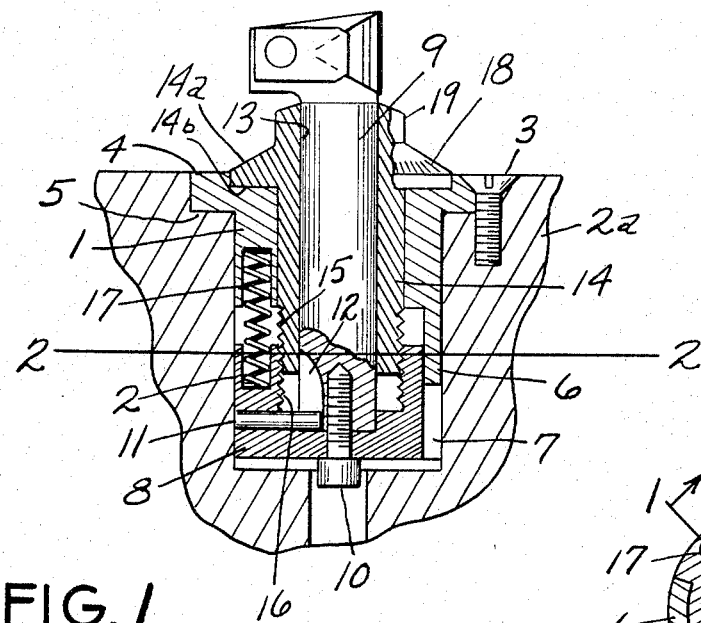
Figure 2:
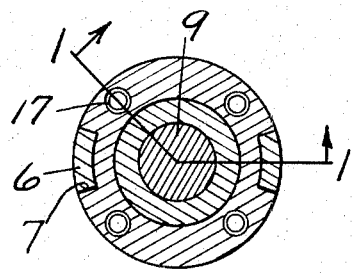
Figure 3:
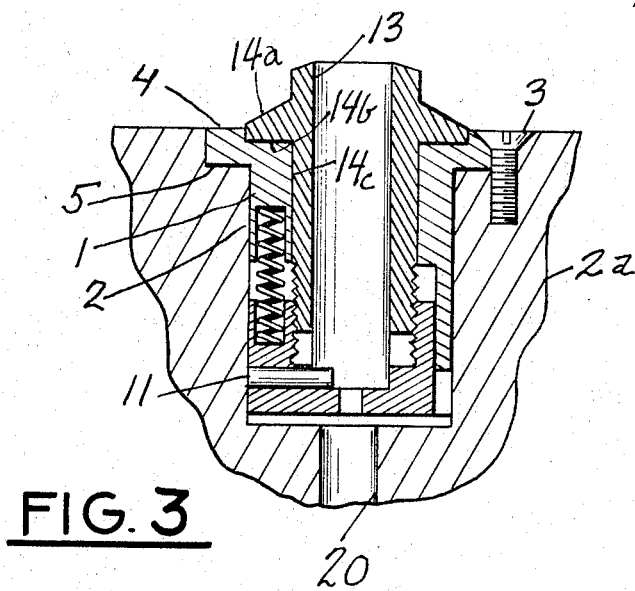

In the drawings, FIG. 1 is a section on line 1—1 of FIG. 2, FIG. 2 is a section on line 2—2 of FIG. 1 showing a preferred form of cartridge mounted in a boring bar or other tool block, and FIG. 3 is a view similar to FIG. 1 prior to mounting the tool holder.

The cartridge has an outer sleeve 1 solidly anchored in a socket 2 in the body 2a of a boring bar or the like by any suitable means such as screws 3 which clamp a rim 4 at the outer end of the sleeve solidly into an enlarged recess 5. When the screws are tightened, the sleeve 1 is rigidly fixed and precisely located on the bar.

At the inner end, the outer sleeve 1 has integral key members 6 slidably received in keyways 7 in the side walls of a cup shaped member 8 slidably received in the socket 2. The member 8 may move axially in and out of the socket but is prevented by the keys 6 from rotating in the socket relative to the outer sleeve. From one aspect, the members 6, 7 comprise interfitting axial tongues and grooves.

The shank 9 of a tool holder is fixed to the bottom wall of the cup member 8 by a screw 10 and is keyed to the member by a pin 11 cooperating with a keyway 12 in the shank. The shank of the holder is active to the cup shaped member 8. The tool holder may have a brazed or a clamped cutting bit shaped for the desired type of cut. A wide variety of tool holders may be interchangeably mounted in the cartridge. In all tools, the cutting edge is outside the sleeves and the cutting thrust is primarily lateral with a component along the axis of the shank.

The shank 9 has a close fit in a bore 13 in an intermediate sleeve 14 having external threads 15 on its inner end screwed into internal threads 16 in the member 8. A plurality of coil springs 17 arranged between the sleeve 1 and the member 8 urge the member 8 downward and take up any lost motion between the threads 15, 16. The springs 17 also hold an outwardly projecting flange 14a on the sleeve 14 seated in a recess 14b in the outer sleeve 1. The recess 14b provides a thrust bearing for the intermediate sleeve. The threads 15, 16 are preferably precision micrometer threads so that the position of the tool holder is indicated by suitable graduations 18 on the flange 14a of the sleeve 14. The threads 15, 16 are located at the bottom of sleeve 14 and do not have to absorb lateral cutting thrust. The lateral cutting thrust is taken from the shank 9 through the bore 13 in intermediate sleeve 14 and through the bore 14c in outer sleeve 1 to the socket 2. This provides rigidity for absorbing the thrust with parts which can be easily made. The adjusting threads 15, 16 are not called upon to take the cutting thrust. The springs 17 also hold the sleeve 14 in the adjusted position.

Only a single screw 10 need be removed to change cutting tool holders. The smooth shanks 9 of the tool holders can easily be made to precise dimensions so that the substitution of a new tool holder does not affect the accuracy. The accuracy is further improved by the rigid construction and by the telescoping relation of the sleeves 1 and 14 and the shank 9. The removal of the tool holder does not change the adjustment. The sleeve 14 and the cup shaped member 8 remain in place while a tool holder is being removed and replaced.

In use, the desired tool is mounted by inserting the shank 9 in the cartridge and the tool is fixed in place by screw 10. The cartridge may now be mounted in the body and fixed in place by screws 3. The depth of cut is adjusted by turning the sleeve 14, a wrench surface 19 being provided for that purpose.

The tool holder can be fixed in place by screw 10 without removing the cartridge from the bar 2a, as a wrench clearance hole 20 can extend through the bar permitting the screw 10 to be inserted and tightened into the holder 9.

The construction is not limited to cutting tools. It is also useful for adjustable stop buttons or other parts requiring accurate positioning.

What is claimed as new is:

1. A cartridge insert for mounting in a body comprising an outer sleeve having associated means for fixing it in the body, an intermediate sleeve journaled in the outer sleeve, a tool having a shank and a part at one end of the shank, said shank being slidably received in the intermediate sleeve, said part exerting a thrust on the shank, a thrust bearing on the outer sleeve for taking thrust from the intermediate sleeve in the direction of said thrust, an annular shaped member non-rotatably keyed to the outer sleeve, means for fixing the shank to said member, coaxial interengaging threads on the annular shaped member and on the intermediate sleeve for moving the annular shaped member axially as the intermediate sleeve is turned relative to the outer sleeve, and spring means between the outer sleeve and the member for exerting an axial thrust on the intermediate sleeve in the direction of said cutting thrust to hold the intermediate sleeve against its thrust bearing and for taking up clearance between the threads.

2. The insert of claim 1 in which the annular shaped member is cup shaped and keying means comprises an interfitting axial tongue and groove on said outer sleeve and the side walls of said cup shaped member.

3. The insert of claim 1 in which the part has a cutting edge.

References Cited
UNITED STATES PATENTS

| | | | |
|---|---|---|---|
| 2,125,005 | 7/1938 | Jearum | 29—96 |
| 3,178,969 | 4/1965 | Yogus | 77—58 |

WILLIAM W. DYER, Jr., *Primary Examiner.*

HARRISON L. HINSON, *Examiner.*